(12) United States Patent
Newkirk

(10) Patent No.: US 7,243,234 B2
(45) Date of Patent: Jul. 10, 2007

(54) ENCRYPTION KEY REKEYING APPARATUS AND METHOD

(75) Inventor: Dennis R. Newkirk, West Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 686 days.

(21) Appl. No.: 10/651,498

(22) Filed: Aug. 29, 2003

(65) Prior Publication Data

US 2005/0047600 A1    Mar. 3, 2005

(51) Int. Cl.
*G06F 1/24* (2006.01)
(52) U.S. Cl. .................. 713/171; 713/182; 713/189
(58) Field of Classification Search .......... 713/171, 713/182, 189
See application file for complete search history.

(56) References Cited

U.S. PATENT DOCUMENTS 5,093,860 A * 3/1992 Steinbrenner et al. ...... 380/273
5,150,408 A * 9/1992 Bright ........................ 380/273
5,471,532 A   11/1995 Gardeck et al.

* cited by examiner

*Primary Examiner*—Thomas R. Peeso
(74) *Attorney, Agent, or Firm*—Terri S. Hughes; Valerie M. Davis

(57) ABSTRACT

When a roaming communication unit (15) requires an updated encryption key to ensure continued secure communications with other communication units of its home system, it transmits a rekey request to a base site (16) for the system (14) in which it has a presence. The latter provides the rekey request to a key management facility (17) for that system. This key management facility, in turn, provides the rekey request to the key management facility (13) for the roaming communication unit's home system (10). The latter then forwards a rekeying message that includes a rekeying encryption key to the roaming communication unit (15) with the second system's key management facility (17) acting as an intermediary. In a preferred embodiment, the rekey message is encrypted using an encryption key that is presently available to the roaming communication unit but not to the second system's key management facility. Therefore, although the latter acts as an intermediary to facilitate the rekeying process, the latter is not able to decrypt the rekeying message and thereby gain access to the encryption key or keys of the roaming communication unit's home system.

17 Claims, 3 Drawing Sheets

ENCRYPTION KEY REKEYING APPARATUS AND METHOD

TECHNICAL FIELD

This invention relates generally to encrypted communications and more particularly to wireless over-the-air rekeying.

BACKGROUND

Encryption methodologies of various kinds are well known in the art. In general, the contents of a so-called plain-text message (which may comprise, for example, an alphanumeric message, digitized voice or vocoded voice, and so forth) are encoded pursuant to an encryption algorithm as a function of one or more encryption keys. Ideally, the resultant data stream will appear, for all intents and purposes, as a random string of data elements (such as alphabetic characters or binary ones and zeros) notwithstanding the underlying pattern of the original informational content itself Encryption techniques are often employed to protect wireless communications from unauthorized monitoring and eavesdropping.

Maintaining the security of an encrypted communication system usually requires ongoing care and careful observation of specific procedures. For example, the encryption key(s) itself must be well protected as the encryption algorithm utilized by a given system will itself often be known or ascertainable. As part of ensuring such security, the encryption key or keys for a given system will often be changed from time to time. There are various ways to facilitate this activity, but generally speaking, system operators prefer to arrange for a new key to be provided to the communication units of a given system on an as-needed basis (or shortly before such anticipated need). When a system operator has direct physical access to a given communication unit a new encryption key can be installed with a relatively high assurance of security as the operator can chose a physical location and the circumstances attending such installation.

It is not always convenient or even possible, however, for all of the wireless communication units in a given system to be brought, more or less simultaneously, to a common location to permit the physical installation of a new encryption key. As a result, the logistic challenge of installing a new encryption key over a wide number of geographically distributed communication units can be challenging enough to discourage some operators from varying their encryption keys in a sufficiently aggressive manner to comport with generally recommended security protocols.

One solution has been to provide a wireless transmission to such wireless communications units that includes the new encryption key. To protect that new encryption key, the rekeying message, including the new encryption key, is often encrypted through use of another encryption key. In a relatively closed system, this approach tends to constitute a satisfactory solution. The key management facility of a given wireless communication system can readily accommodate the necessary process to effect the installation of new encryption keys while using another encryption key with an acceptable level of security.

Many modern communication units, encrypted and otherwise, are capable of extra-system performance, however. For example, an encrypted communication unit belonging to a first system can roam outside of that first system and into a second system and nevertheless operate compatibly within the second system. This compatible operation can include, for example, both encrypted and clear communications with other units that also belong to the first system. When the home system switches its encryption key, however, this switch must be accomplished for roaming communication units as well as for more locally positioned units. Otherwise, the roaming units will no longer be able to communicate in an encrypted mode compatibly with other system users.

To meet this need, the prior art provides for a communication link between the key management facilities of differing systems. So configured, a roaming communication unit can communicate with the key management facility of a non-home system and request, for example, a rekeying event. That key management facility then contacts the home key management facility for that communication unit and receives the rekeying information. The rekeying information will be encrypted with the second encryption key in accord with prior practice. To make use of that information, however, the non-home system key management facility must be provided with the second encryption key (because the non-home system key management facility must have clear access to the new encryption key in order to facilitate rekeying the roaming communication unit). This means that the non-home system key management facility therefore will have access to the other system's encryption key itself.

For many applications this is acceptable. For other applications, however, this presents an unacceptable breach of security. Non-system access to one's encryption key permits a variety of unauthorized and undesired activities, including but not limited to eavesdropping, inappropriate programming of the communication units themselves, and so forth. Notwithstanding this attendant risk of compromised security, however, the above-described process, whereby an intervening key management facility has knowing access to the encryption key of another system in order to thereby effect the proper and timely rekeying of a roaming communication unit, essentially represents a typical and present best available rekeying process.

BRIEF DESCRIPTION OF THE DRAWINGS

The above needs are at least partially met through provision of the encryption key rekeying apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a rekeying event for a roaming communication unit can be supported with the aid of a non-home key management facility but without disclosing to that non-home key management facility either the new encryption key or the encryption key used to encyrpt the new encryption key during the rekeying process.

In a preferred approach, a key management facility essentially effects rekeying in substantially the same manner regardless of whether the rekeying target communication unit is a roaming unit or a non-roaming unit. Upon receiving an encryption key rekeying request from a non-roaming communication unit, the facility communicates a rekeying message that includes a rekeying encyryption key, wherein at least a portion of the rekeying encryption key is encrypted using an encryption scheme that is decypherable by the non-roaming communication unit. In a similar fashion, upon receiving an encryption key rekeying request from a roaming communication unit, the facility communicates a rekeying message that again includes a rekeying encryption key, wherein again at least a portion of the rekeying encryption key is encrypted as a function of an encryption scheme that is decypherable by the roaming communication unit.

So configured, the roaming communication unit will essentially receive the same rekeying message as a non-roaming communication unit albeit through the auspices of a non-home system key management facility. Although the latter receives the rekeying message from the home system key management facility, the non-home system key management facility neither has nor needs the encryption key that the home system key management facility employs to encrypt the rekeying encryption key. As a result, the encryption keys of the home system remain secure notwithstanding their passage through the non-home system to effect rekeying of the roaming unit.

Though counterintuitive to the architectural premise that underlies the configuration and deployment of the key management facilities, this approach nevertheless holds considerable promise for compatible, effective, and secure rekeying of remotely located communication units.

The rekeying message itself can comprise a single message or a plurality of messages as desired and/or as appropriate to the needs of a given system or protocol.

Figure 1:
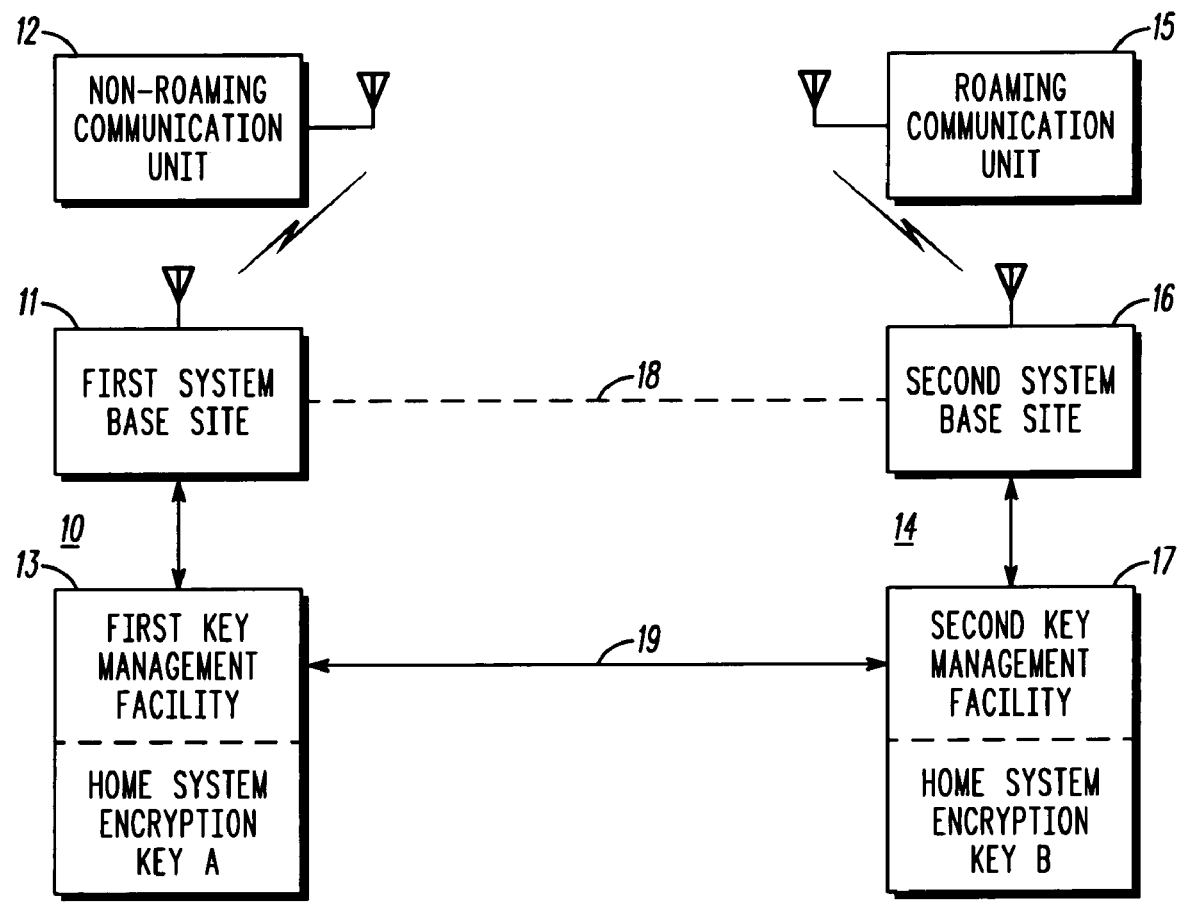
FIG. 1 comprises a block diagram of two communication systems as configured in accordance with an embodiment of the invention.

Referring now to the drawings, and in particular to FIG. 1, a first communication system 10 will typically include at least a first system base site 11 that supports wireless communications with one or (typically) more non-roaming communication units 12 that operate within the coverage range of the first system base site 11. (Those skilled in the art will recognize that, in a typical installation, a system such as this will more likely include a considerably greater number of base sites to permit expanded geographic coverage and/or expanded traffic capacity. Only one such base site is illustrated here for the purpose of fostering clarity.) The communication services that this first system 10 supports can be many and can be varied (including, for example, both voice services and various kinds of bearer data services). The teachings set forth herein are compatible with such variations and will likely remain so as hereafter developed services are proposed or brought on-line. Such a system can also use whatever resource allocation and/or modulation and signaling protocol may be appropriate or desired to suit the needs of a given application. In general, such system elements are well understood in the art and therefore will not be elaborated on here in greater detail. In a preferred embodiment this wireless communication system will support wireless encrypted communications amongst authorized non-roaming and roaming communication units using at least one active home system encryption key as noted below.

Encryption keys as utilized by the non-roaming communication unit 12 are controlled by a first key management facility 13 such as a key management facility as is known and understood in the art. Such a facility 13 operably couples to the first system base site 11 to effect, for example, rekeying of communication units. (Such rekeying can be occasioned in response to a variety of stimuli, including but not limited to specific requests from communication units or pre-programmed rekeying actions that are triggered by specific events or the attainment of a predetermined point in time.) To this end, the first key management facility 13 will typically have one or more home system encryption keys. For purposes of this description, we presume that the first key management facility 13 presently uses home system encryption key A. This means that encrypted communications within the first system 10 are encrypted as a function of encryption key A.

Figure 2:
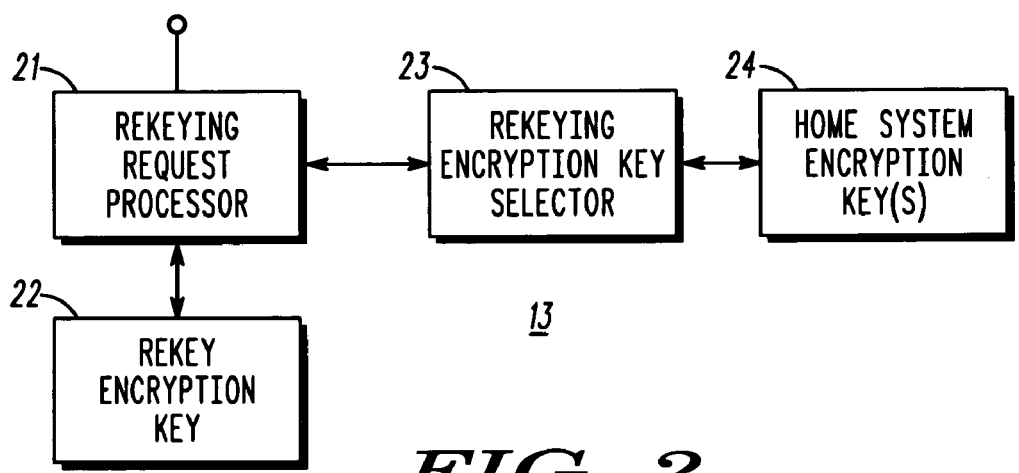
FIG. 2 comprises a block diagram of a portion of a key management facility as configured in accordance with an embodiment of the invention.

With momentary reference to FIG. 2, the first key management facility 13 will preferably include a rekeying request processor 21, a rekey encryption key 22, a rekeying encryption key selector 23, and a home system encryption key or keys 24. Such functionality can be provided through a combination of discrete platforms or through use of an integral, likely programmable platform. Such architectural choices are well understood in the art.

The rekeying encryption key selector has a rekeying home system encryption key output and serves, at least in part, to select a new active home system encryption key (as a function, for example, of a temporal schedule). The selector 23 may select a new encryption key by generating it upon demand or, as shown, by selecting one of many candidate encryption keys 24. The rekeying request processor 21 then serves, at least in part, to encrypt the new encryption key as selected by the encryption key selector 23 using another encryption key 22. (It will be understood that this second encryption key 22 can be essentially fixed for a given system or can be varied in response to the passage or time or the attainment or detection of other milestone events or triggers. It is also possible that this second encryption key 22 can be the same as the home system encryption key if that approach is considered sufficiently secure for a given application.) The rekeying request processor 21 provides substantially the same rekeying home system encryption key output, in substantially the same format, in response to a rekeying request from both a non-roaming and a roaming authorized communication unit. This is achieved, in part, by encrypting the rekeying information to be transmitted to either the roaming or the non-roaming communication unit using an encryption key that is likely possessed by a receiving authorized roaming or non-roaming communication unit. Furthermore, in a preferred embodiment, this rekeying information will be encrypted using an encryption key that is likely not possessed by an intermediary communication system node (such as, but not limited to, an intermediary other-system key management facility).

Referring again to FIG. 1, as mentioned above, first system communication units can roam away from the first system 10. For example, as illustrated, a roaming communication unit 15 can move to a second system 14 having a second system base site 16. The roaming communication unit 15 can communicate with non-roaming communication units 12 via the second system base site 16 and an appropriate link 18 that couples the latter to the first system 10 and ultimately to the first system base site 11. When both communication units 15 and 12 have compatible encryption keys these communications can be encrypted.

In this exemplary embodiment the second system 14 has a second key management facility 13. So configured, the latter can administer the distribution and subsequent usage of a second system home system encryption key (which encryption key will typically be different from the encryption key used by the first system 10 and unknown to the latter as well). Pursuant to a preferred approach, the second key management facility 17 has a communication link 19 to the first key management facility 13 of the first system 10. As shown, this communication link 19 can comprise a dedicated link such as a landline. Other approaches can be used as well, however, including but not limited to a shared intranet or extranet (including, for example, the Internet) link. This link may be fully wireline, wireless, or a combination of both as may suit the needs and requirements of a given application. So configured, the second key management facility 17 can serve as an intermediary communication system node to effect rekeying of the roaming communication unit 15 by the first key management facility 13.

Figure 3:
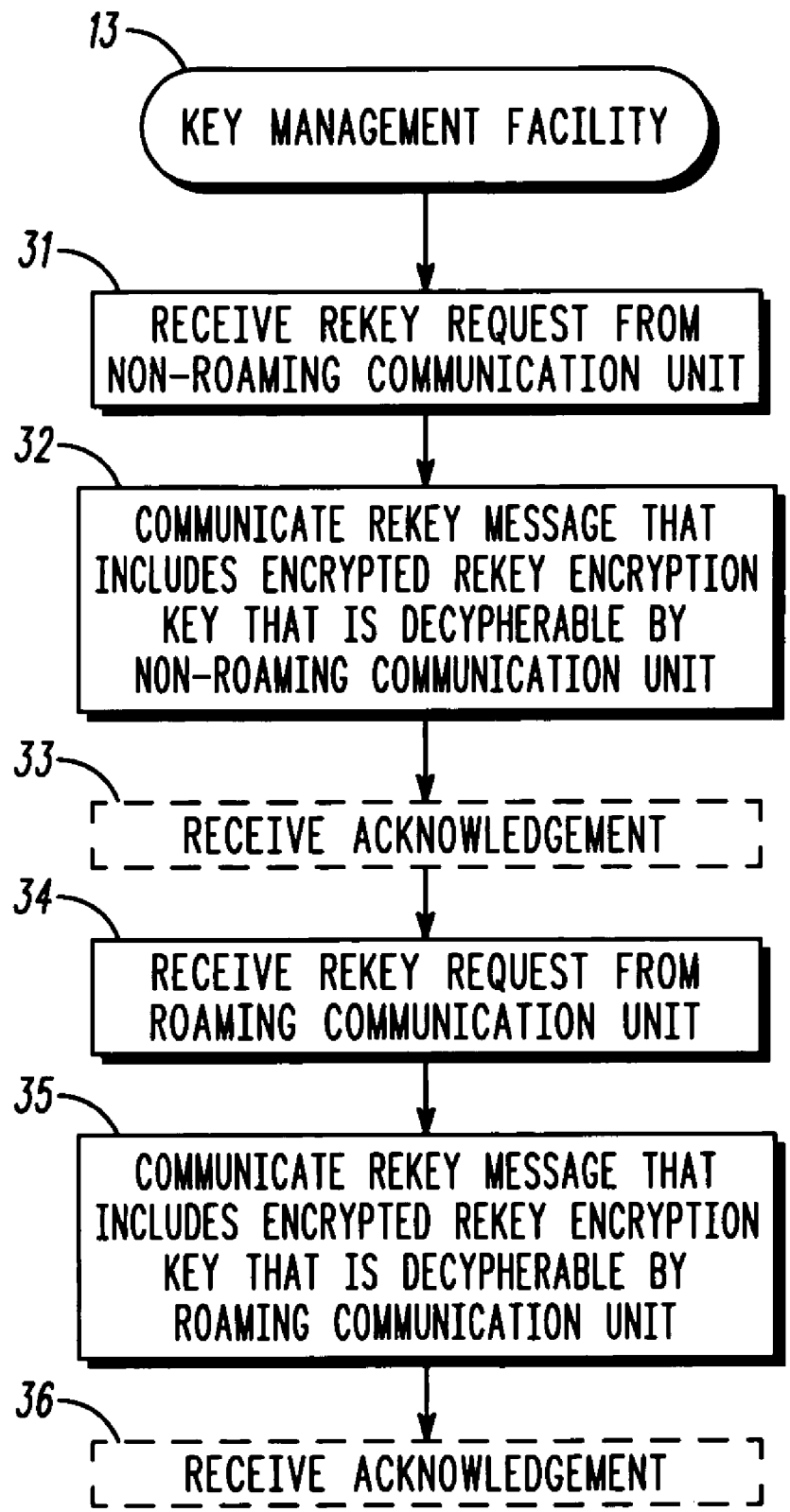
FIG. 3 comprises a flow diagram as configured in accordance with various embodiments of the invention.

To illustrate, and referring now to FIG. 3, the first key management facility 13, upon receiving 31 a rekey request from a non-roaming communication unit, can communicate 32 a rekeying message to the non-roaming communication unit that includes a rekeying encryption key wherein at least a portion of the rekeying encryption key is encrypted using an encryption scheme that is decypherable by the non-roaming communication unit. The wireless facilities of the first system 10 are preferably employed to effect this communication. Optionally, the key management facility will receive 33 an acknowledgement from the non-roaming communication unit to confirm receipt of the rekeying message and/or successful rekeying.

In a similar fashion, this same key management facility 13 can receive 34 a rekey request from a roaming communication unit. In a preferred embodiment an intermediary communication system serves to forward this rekey request from the roaming communication unit to the key management facility 13. In particular, the key management facility 17 for the system into which the roaming communication unit has roamed can preferably serve this intermediary function. The home system key management facility 13 can then communicate 35 a rekey message to the roaming communication unit through that same intermediary facility.

This rekey message will preferably include a rekeying encryption key to be subsequently used by the roaming communication unit (either immediately or at a scheduled or otherwise triggered future time). In a preferred embodiment, this rekeying encryption key will itself have at least a portion thereof encrypted as a function of an encryption scheme that is decipherable by the roaming communication unit; that is, the roaming communication unit does not require an intermediary platform to decrypt the rekeying message as the roaming communication unit has the pre-existing wherewithal to permit such decryption (in particular, the roaming communication unit has the necessary encryption key or keys to permit decryption of the rekeying message). So configured, the intermediary platform, while necessary to permit the forwarding of the rekeying message to the roaming communication unit, does not itself need to decrypt the rekey message in order to facilitate the rekeying of the roaming communication unit. This, in turn, permits maintaining the encrypted nature of the rekeying encryption key with respect to the intermediary facility in direct contravention of prior art practice and thereby better assuring the confidential nature of the rekeying encryption key.

The rekeying message can comprise a single message or can be parsed over a plurality of discrete messages as desired. For example, the complete rekeying message can include communicating a first rekeying message to the roaming communication unit and then providing a second rekeying message to the roaming communication unit (in response, for example, to receipt of an acknowledgement message from the roaming communication unit in response to receiving the first rekeying message).

So configured, it can be seen that the roaming communication unit can utilize its existing home system encryption key (or some other encryption key as may be specifically utilized for the encryption of rekeying encryption keys) to decrypt the rekeying encryption key upon receipt. There is no specific need for a unique roaming encryption key nor for any encryption keys of the second system to be brought into usage.

Upon successfully receiving the rekeying message, if desired, the roaming communication unit can transmit a corresponding acknowledgement message that is then received 36 by the first key management facility 13. Of course, if such an acknowledgement is expected and not received, the key management facility can pursue such other course of action as may be desired or appropriate. For example, the key management facility can automatically retransmit the rekeying message. As another example, the key management facility can wait for a new rekeying request from the roaming communication unit prior to taking any subsequent action.

Figure 4:
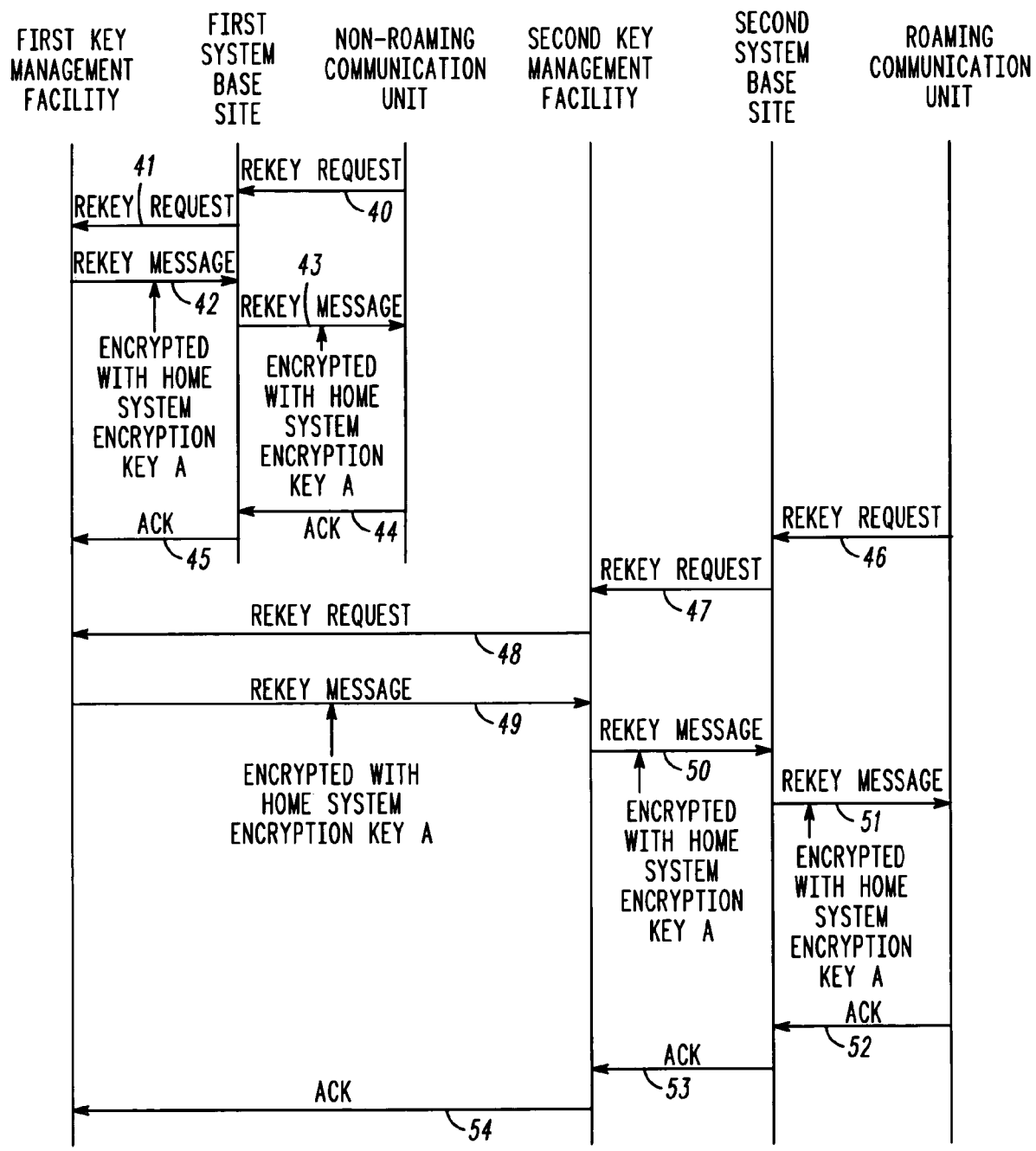
FIG. 4 comprises a signaling diagram as configured in accordance with various embodiments of the invention.

The overall flow of these various processes may be better understood upon reference to FIG. 4.

A non-roaming communication unit can begin the rekeying process by transmitting a rekey request 40 to the first system base site. The first system base site then forwards 41 that rekey request to the first key management facility. The latter responds with a rekey message 42 that includes an encrypted rekey encryption key to the base site which then forwards 43 that rekey message to the non-roaming communication unit. Upon successfully receiving and/or effecting the rekey event, the latter can then transmit an acknowledgement message 44 to the first system base site. The latter will then forward 45 that acknowledgement to the first key management facility to complete the process.

Though effected through an intermediary key management facility, much the same process serves to facilitate the rekeying of a roaming communication unit. The roaming communication unit transmits a rekey request 46 to the second system base site which then transfers 47 that rekey request to the second system key management facility.

The latter determines the address of the destination for this rekey request. For example, the second system key management facility may be able to identify the first key management facility by referring to a specific address or other identity or alias as may be included in the rekey request itself As another example, the second system key management facility may have access to a look-up table or other presence or home register database or server that can be used to correlate information from the roaming communication unit (such as its self-identifying information) with the address information for the first key management facility. These are only illustrative examples and it will be understood that various other ways of providing or obtaining this information are presently known and will no doubt be further supplemented with hereafter-developed methods and techniques. The second key management facility then forwards 48 that rekey request to the first key management facility.

As with a non-roaming communication unit, the first key management facility prepares a rekey message and transmits 48 that rekey message back to the second key management facility. This rekey message will preferably be encrypted using, for example, a home encryption key for the first communication system. This rekey message can be comprised of a single transmission/message or can be comprised of a plurality of transmissions/messages as noted above. This rekey message will typically include a rekey encryption key to be provided to the roaming communication unit along, optionally, with other additional rekeying information as may be appropriate in a given system. For example, the rekey message could include information regarding when the roaming communication unit should begin to use the new encryption key.

The second key management facility, without decrypting this rekeying message (in part because it is not necessary and in part because the second key management facility lacks the encryption key to facilitate the decryption process), then forwards 50 that rekey message to the second system base site. The latter will then transmit 51 that encrypted rekey message to the roaming communication unit.

Following receipt of the rekey message and/or following successfully effecting a corresponding rekeying event, the roaming communication unit transmits an acknowledgment 52 to the second system base site, which forwards 53 that acknowledgement to the second key management facility. The latter, as with the other messages that correspond to the rekey activity, then forwards 54 that acknowledgement to the first key management facility.

Pursuant to these various embodiments, a roaming communication unit can remain current with respect to the encryption key or keys being used by its home system while simultaneously permitting the system to which it has roamed to act as an intermediary for that rekeying process while avoiding potentially compromising the security of the new encryption key. Unlike prior practice in this regard, the rekey process will now proceed in a manner that is essentially transparent to the roaming unit. At the same time, although the second system's key management facility remains unaware of the first system's encryption key (and hence remains unaware of the exact contents of the complete rekey message), this key management facility nevertheless remains functional as a rekeying intermediary. As a further benefit, these embodiments can be readily implemented in a relatively cost effective manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method comprising:
   at a key management facility:
      receiving an encryption key rekeying request from a non-roaming communication unit;
      communicating to the non-roaming communication unit a rekeying message that includes a rekeying encryption key, wherein at least a portion of the rekeying encryption key is encrypted using an encryption scheme that is decypherable by the non-roaming communication unit;
      receiving an encryption key rekeying request from a roaming communication unit;
      communicating to the roaming communication unit a rekeying message that includes a rekeying encryption key, wherein at least a portion of the rekeying encryption key is encrypted as a function of an encryption scheme that is decypherable by the roaming communication unit.

2. The method of claim 1 wherein receiving an encryption key rekeying request from a roaming communication unit includes receiving an encryption key rekeying request from a roaming wireless communication unit.

3. The method of claim 1 wherein receiving an encryption key rekeying request from a roaming communication unit includes receiving an encryption key rekeying request from a roaming communication unit via at least one intermediary communication system.

4. The method of claim 3 wherein communicating to the roaming communication unit a rekeying message that includes a rekeying encryption key, wherein at least a portion of the rekeying encryption key is encrypted as a function of an encryption scheme that is decypherable by the non-roaming communication unit includes communicating to the roaming communication unit a rekeying message that includes a rekeying encryption key, wherein at least a portion of the rekeying encryption key is encrypted as a function of an encryption scheme that is decypherable by the roaming communication unit and not readily decypherable by the at least one intermediary communication system.

5. The method of claim 1 and further comprising:
   receiving an acknowledgement message from the roaming communication unit to indicate successful reception of the rekeying message.

6. The method of claim 1 wherein communicating to the roaming communication unit a rekeying message includes:
   communicating to the roaming communication unit a first rekeying message;
   receiving an acknowledgement message from the roaming communication unit in response to receiving the first rekeying message;
   communicating to the roaming communication unit at least a second rekeying message;
   wherein at least one of the first and second rekeying message includes the rekeying encryption key.

7. The method of claim 1 wherein communicating to the roaming communication unit a rekeying message that includes a rekeying encryption key includes communicating to the roaming communication unit a rekeying message that includes a rekeying encryption key that comprises a home system encryption key for the key management facility, such that the roaming communication unit is provided with a home system encryption key as corresponds to the home communication system for the roaming communication unit as versus a unique roaming encryption key or an encryption key as is used by a communication system into which the roaming communication unit has roamed.

8. A key management facility comprising:
   at least one active home system encryption key;
   a rekeying encryption key selector having a rekeying home system encryption key output;
   a rekeying request processor that is operably coupled to the rekeying encryption key selector;
   a wireless communication interface that is operably coupled to the at least one active home system encryption key and the rekeying request processor and wherein the wireless communication interface further couples to a wireless home communications system that supports wireless encrypted communications amongst authorized wireless non-roaming and roaming communication units using the at least one active home system encryption key;

wherein the rekeying request processor provides substantially the same rekeying home system encryption key output, in substantially the same format, in response to a rekeying request from both a non-roaming and a roaming authorized communication units.

9. The key management facility of claim 8 and further comprising a plurality of active home system encryption keys.

10. The key management facility of claim 8 wherein the rekeying encryption key selector includes rekeying means for selecting a new active home system encryption key.

11. The key management facility of claim 10 wherein the rekeying means selects the new active home system encryption key as a function, at least in part, of a temporal schedule.

12. The key management facility of claim 8 wherein the wireless communication interface includes encryption means for encrypting rekeying information to be transmitted to either of a roaming and a non-roaming communication unit using an encryption key that is likely possessed by a receiving authorized roaming and non-roaming communication unit but that is not likely possessed by an intermediary communication system node.

13. The key management facility of claim 12 wherein the intermediary communication system node includes another encryption management facility.

14. A method for rekeying wireless communication units that share a home key management facility, comprising:

at a roaming communication unit:
  transmitting via a second key management facility a rekeying request to the home key management facility;

at the home key management facility:
  receiving the rekeying request;
  preparing a rekeying message, which rekeying message includes at least a rekeying encryption key, and which rekeying message is at least partially encrypted using an encryption key that is possessed by the roaming communication unit and not by the second key management facility;
  transmitting at least a portion of the rekeying message to the roaming communication unit via the second key management facility;

at the roaming communication unit:
  receiving the rekeying message as transmitted by the home key management facility;
  decrypting the rekeying message using the encryption key.

15. The method of claim 14 and further comprising, at the roaming communication unit, transmitting a rekeying message reception acknowledgement message via a communication system that includes the second key management facility to the home key management facility.

16. The method of claim 15 and further comprising, at the home key management facility, receiving the rekeying message reception acknowledgement.

17. The method of claim 16 and further comprising, at the home key management facility, transmitting additional rekeying information to the roaming communication unit via the communication system that includes the second key management facility.

* * * * *